(12) United States Patent
Jiang et al.

(10) Patent No.: US 11,140,393 B1
(45) Date of Patent: Oct. 5, 2021

(54) DISPLAY DEVICE, ENCODER WITH ADAPTIVE QUANTIZATION PARAMETER AND IMAGE PROCESSING METHOD

(71) Applicant: Novatek Microelectronics Corp., Hsinchu (TW)

(72) Inventors: Hui-Yu Jiang, Hsinchu (TW); Heng-Yao Lin, Tainan (TW); Yen-Tao Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/898,399

(22) Filed: Jun. 10, 2020

(51) Int. Cl.
*H04N 19/124* (2014.01)
*H04N 19/186* (2014.01)
*H04N 19/159* (2014.01)

(52) U.S. Cl.
CPC ......... *H04N 19/124* (2014.11); *H04N 19/159* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 5,126,841 | A * | 6/1992 | Tanaka | H04N 7/141 348/E7.078 |
| 7,742,521 | B2 * | 6/2010 | Vitali | H04N 19/94 375/240.03 |
| 2011/0249906 | A1 * | 10/2011 | Chen | G09G 5/36 382/233 |
| 2014/0286436 | A1 * | 9/2014 | Sato | H04N 19/124 375/240.18 |
| 2020/0120340 | A1 * | 4/2020 | Park | G06T 9/002 |

* cited by examiner

*Primary Examiner* — Lindsay J Uhl
(74) *Attorney, Agent, or Firm* — JCIPRNET

(57) ABSTRACT

A display device that includes an encoder circuit, a decoder circuit and an overdrive circuit is introduced. The encoder circuit includes a prediction circuit, a quantization circuit, and a bitstream coding circuit. The prediction circuit performs a prediction operation on a first image frame to generate a second image frame. The quantization circuit performs a quantization operation on the second image frame based on a quantization parameter to generated a quantized image frame. The bitstream coding circuit encodes the quantized image frame to generate an encoded bit stream. The quantization parameter is determined according to a grey level of a pixel in the second image frame. The decoder circuit decodes the encoded bit stream to generate a reconstructed image frame. The overdrive circuit generates an overdrive image frame to be displayed on a display panel based on a third image frame and the reconstructed image frame.

20 Claims, 6 Drawing Sheets

DISPLAY DEVICE, ENCODER WITH ADAPTIVE QUANTIZATION PARAMETER AND IMAGE PROCESSING METHOD

BACKGROUND

Technical Field

The disclosure generally relates to a display device, and more particularly relates to an encoder, a display device and an image processing method that are capable of reducing distortion of image frame displayed on the display device, thereby improving performance of the display device.

Description of Related Art

A display device with high refresh rate or high frame rate is in high demand. An overdrive technology is commonly implemented in a display system having high refresh rate to boost transition speed between two consecutive image frames. In an overdrive display system, original display data is emphasized or overdriven to generate overdrive data that have higher voltage level than the original display data.

Before the overdrive display system, a compression operation is usually performed on previous image frames to reduce transmission bandwidth and storage space of the image frames. Some display systems use uniform quantization parameter for compression, but the uniform quantization parameter does not work well for image frames with multiple texture levels. Some alternative display systems use non-uniform quantitation parameter for compressing the image frames. However, the compression operation is complicated with high computation cost and may causes unsatisfactory display quality.

As strong demand for a high-quality display device, there has grown a need for a more creative technique to efficiently encode and decode image frames, thereby improving the performance of the display device.

Nothing herein should be construed as an admission of knowledge in the prior art of any portion of the present disclosure.

SUMMARY

An encoder, a display device and an image processing method thereof that are capable of reducing distortion in the display image are introduced.

In some embodiments, the encoder may include a prediction circuit, a quantization circuit and a bitstream coding circuit. The prediction circuit is configured to perform a prediction operation based on a first image frame and generate a second image frame. The quantization circuit is configured to quantize the second image frame according to an adaptive quantization parameter to generated a quantized image frame. The bitstream coding circuit is configured to encode the quantized image frame to generate an encoded bit stream, in which a storage space of the encoded bit stream is less than a storage space of the first image frame, and the adaptive quantization parameter is determined according to a grey level of a pixel of the second image frame.

In some embodiments, the display device may include an encoder circuit, a decoder circuit and an overdrive circuit. The encoder circuit includes a prediction circuit, a quantization circuit and a bitstream coding circuit. The prediction circuit is configured to perform a prediction operation based on a first image frame and generate a second image frame. The quantization circuit is configured to quantize the second image frame according to an adaptive quantization parameter to generated a quantized image frame. The bitstream coding circuit is configured to encode the quantized image frame to generate an encoded bit stream, in which a storage space of the encoded bit stream is less than a storage space of the first image frame, and the adaptive quantization parameter is determined according to a grey level of a pixel of the second image frame. The decoder is configured to decode the encoded bit stream of the quantized image frame to generate a reconstructed image frame according to the quantization parameter. The overdrive circuit is configured to receive a third image frame and the reconstructed image frame and generate overdrive display data to be displayed on a display panel based on the third image frame and the reconstructed image frame.

In some embodiments, the image processing method includes steps of: performing an encoding operation to a first image frame to generate an encoded bit stream according to a quantization parameter; performing a decoding operation to decode the encoded bit stream of the first image frame to generate a reconstructed image frame according to the quantization parameter; and generating overdrive display data to be displayed on a display panel based on a third image frame and the reconstructed image frame. The step of performing an encoding operation to a first image frame to generate an encoded bit stream according to an adaptive quantization parameter includes sub-steps of: performing a prediction operation on the first image frame to generate a second image frame; quantizing the second image frame according to the adaptive quantization parameter to generated a quantized image frame; and encoding the quantized image frame to generate the encoded bit stream. A storage space of the encoded bit stream is less than a storage space of the first image frame, and the adaptive quantization parameter is determined according to a grey level of a pixel of the second image frame.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
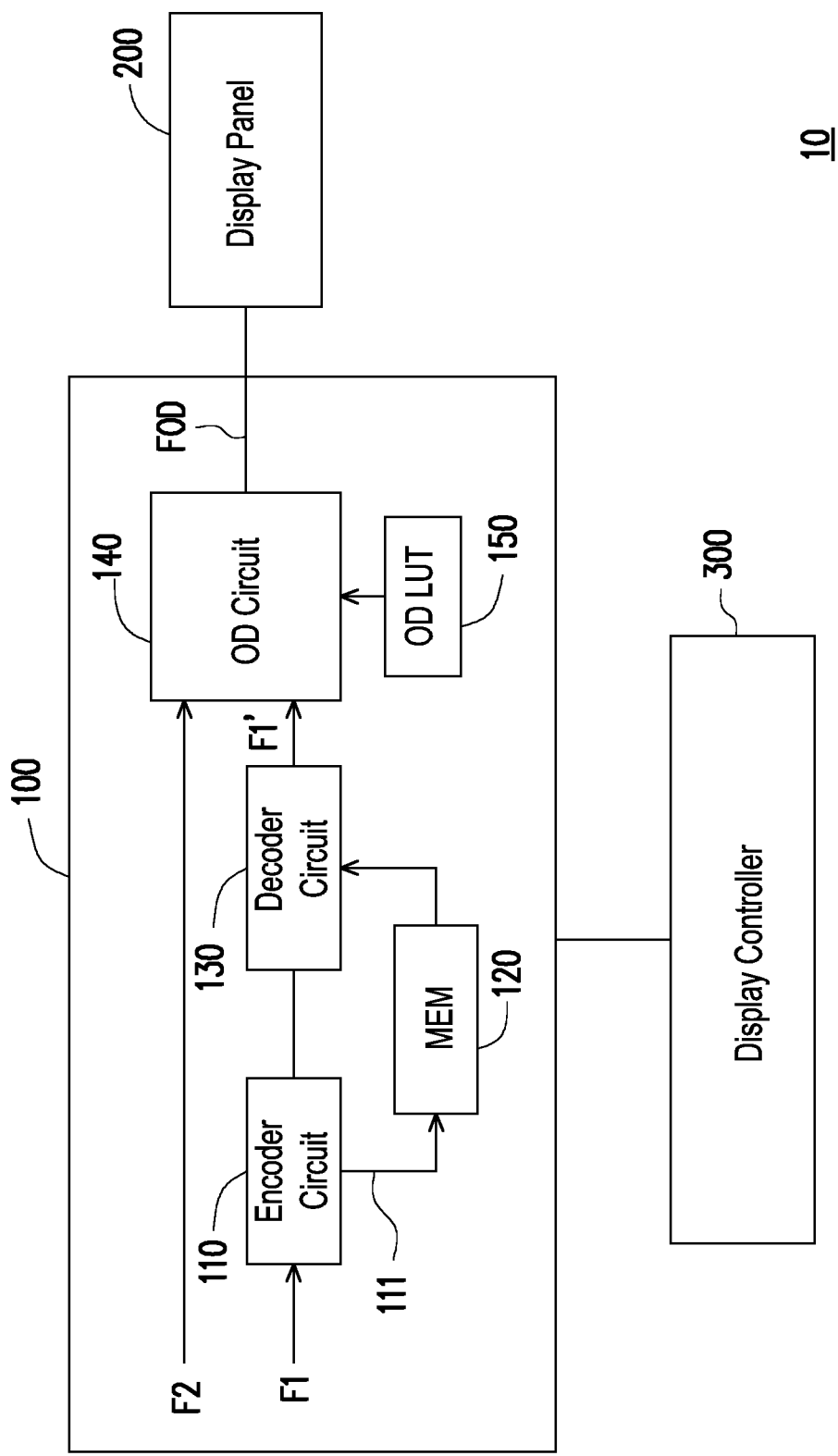
FIG. 1 is a schematic diagram illustrating a display device in accordance with some embodiments.

Referring to FIG. 1, a display device 10 that includes a display driver 100, a display panel 200 and a display controller 300 is illustrated in accordance with some embodiments. The display panel 200 is configured to receive display data of display image frames and display the received display data. The image frames may include a previous image frame F1 (also referred to as first image frame) and a current image frame F2 (also referred to as a third image frame), in which the previous image frame F1 is displayed prior to the current image frame F2. In some embodiments, the previous image frame F1 and the current image frame F2 may be the consecutive or non-consecutive image frames of an image sequence. In some alternative embodiments, the previous image frame F1 and the current image frame F2 may belong to two difference video sequences. In some embodiments, the display panel 200 is a liquid crystal display (LCD) panel, but the disclosure is not limited thereto. Any other display panel that is capable of display image frames fall with the scope of the disclosure.

The display driver 100 is configured to drive the display panel 200 to display the image frames F1 and F2 on the display panel 200. It is assumed that the previous image frame F1 was displayed on the display panel 200 and the current image frame F2 is going to be displayed on the display panel 200. In some embodiments, the display driver 100 overdrives the display data of the current image frame F2 based on a change of display data between the previous image frame F1 and the current image frame F2 to improve the response speed of the display device 10.

In some embodiments, the display driver 100 may include an encoder circuit 110, a memory 120, a decoder circuit 130 and an overdrive (OD) circuit 140. The encoder circuit 110 is configured to receive the previous image frame F1 and perform an encoding operation to the previous image frame F1 to generate an encoded bit stream 111. The encoded bit stream 111 may occupy smaller storage space and has smaller transmission bandwidth than the previous image frame F1. In other words, the encoding operation that is performed by the encoder circuit 110 may compress the previous image frame F1 to generate the encoded bit stream 111. In some embodiments, the encoding operation may include a quantization operation that is characterized by an adaptive quantization parameter.

The adaptive quantization parameter may correspond to an adaptive quantization step size that defines how much details of the previous image frame F1 is retained in the encoded bit stream 111 and how many bits are needed for encoding the previous image frame F1. For example, as the adaptive quantization step size decreases, more details of the previous image frame F1 are retained in the encoded bit stream 111, and more bit number is required for the encoding operation. By contrast, as the adaptive quantization step size increases, less details of the previous image frame F1 are retained in the encoded bit stream 11 and less bit number is required for the encoding operation. As such, the adaptive quantization step size (or adaptive quantization parameter) may be used to regulate how much details of the previous image frame F1 are retained in the encoded bit stream 111.

In some embodiments, the adaptive quantization step size defines a distance between two successive quantization levels. The adaptive quantization step size may be derived from the adaptive quantization parameter based on a lookup table or based on a computational derivation. In some embodiments, the adaptive quantization step size is directly proportional to the adaptive quantization parameter. As the adaptive quantization parameter increases, the adaptive quantization steps size increases; and as the adaptive quantization parameter decreases, the adaptive quantization steps size decreases.

The memory 120 is coupled to the encoder circuit 110 and is configured to store the encoded bit stream 111 that is generated by the encoder circuit 110. The memory 120 may provide the stored encoded bit stream 11 to the decoder circuit 130 on demand. The memory 120 may be a volatile memory such as registers, random access memory (RAM) or a non-volatile memory such as a flash memory.

The decoder circuit 130 is configured to reverse the processes of the encoding operation so as to generate a reconstructed image frame F1' of the previous image frame F1 from the encoded bit stream 111. The decoder circuit 130 may receive the encoded bit stream 111 from the memory 120 in an embodiment, and to receive the encoded bit stream 111 directly from the encoder circuit 110 in another embodiment. The decoder circuit 130 is configured to perform a decoding operation to the encoded bit stream 111 based on the adaptive quantization parameter to generate the reconstructed image frame F1'. The adaptive quantization parameter used by the decoder circuit 130 may be same as or different from the adaptive quantization parameter used by the encoder circuit 110.

In some embodiments, the OD circuit 140 receives the reconstructed image frame F1' and the current image frame F2, and is configured to generate an overdrive image frame FOD based on the reconstructed image frame F1' and the current image frame F2. The OD circuit 140 may generate the overdrive image frame FOD based on a change of display data between the reconstructed image frame F1' and the current image frame F2. The overdrive image frame FOD may store overdrive display data of the current image frame F2, in which the overdrive display data of the overdrive image frame FOD is temporarily more emphasized than display data of the current image frame F2. In this way, the overdrive display data of overdrive image frame FOD may cause the pixels of the display panel 200 reaching the intended level much faster than the display data of the current image frame F2. For example, when grey level of the previous display data of a specific pixel of the display panel 200 is "0" and grey level the current display data intended to be display on the specific pixel is "8", the OD circuit 140 may generate an overdrive display data with the grey level of "48". As such, the specific pixel of the display panel 200 may reach to the intended level much faster when using the overdrive display data. Accordingly, the response time of the display device 10 is reduced, and the transition speed between two consecutive image frames displayed on the display panel 200 is boosted.

In some embodiments, the OD circuit 140 uses an OD lookup table (OD LUT) 150 to generate the overdrive image frame FOD based on the reconstructed image frame F1' and the current image frame F2. The OD LUT 150 may store correspondence of data among the overdrive image frame FOD, the current image frame F2 and the reconstructed image frame F1'. In some embodiments, the OD LUT 150 may store correspondence among grey levels of the overdrive image frame FOD, the current image frame F2 and the reconstructed image frame F1'. In some embodiments, the display data of an image frame is represented by red, green and blue (RGB) color space, and the OD LUT 150 may store the correspondence of red values, green values and blue values among the overdrive image frame FOD, the current image frame F2 and the reconstructed image frame F1'.

The display controller 300 may include control logic circuits that are configured to control overall operations of the display device 10. The structure and architecture of the display controller 300 is not limited in the disclosure. In some embodiments, the display controller 300 controls the display driver 100 to perform the encoding operation, the decoding operation, and operation for generating the OD image frame FOD and driving the display panel 200 to display the OD image frame FOD.

Figure 2:
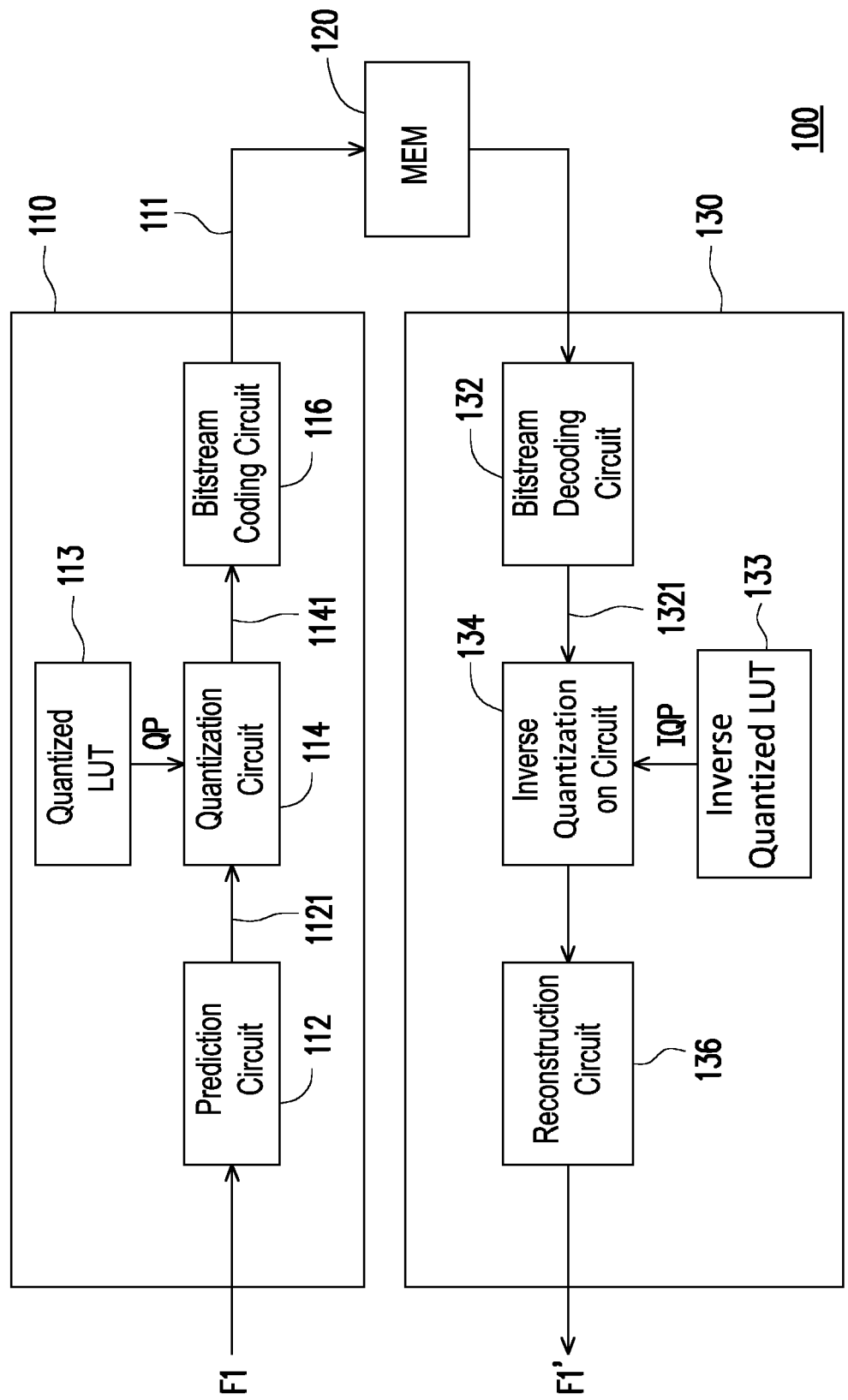
FIG. 2 is a schematic diagram illustrating an encoder circuit and a decoder circuit of a display driver in accordance with some embodiments.

Referring to FIG. 2, structures of the encoder circuit 110 and the decoder 130 of the display driver 100 as shown in FIG. 1 is illustrated in accordance with some embodiments. The encoder circuit 110 may include a prediction circuit 112, a quantization circuit 114 and a bitstream coding circuit 116. The prediction circuit 112 is configured to receive the previous image frame F1 and perform a prediction operation to generate a predicted image frame. The prediction circuit 112 may generate an image frame 1121 based on the predicted image frame. In some embodiments, the image frame 1121 is the predicted image frame that is obtained by performed the prediction operation on the previous image frame F1. In some alternative embodiments, the image frame 1121 is a residual image that is generated by subtracting the predicted image frame from the previous image frame F1. In some embodiments, the prediction operation performed by the prediction circuit 112 is an intra prediction operation. The prediction circuit 112 may perform block-based prediction operation based on at least one of intra prediction modes. The size of each pixel block and the prediction mode for the prediction operation are not limited to any particular number in the present disclosure. For example, the size of each pixel block for the prediction operation may be a 4×4 pixel block or 8×8 pixel block. The prediction mode for the prediction operation may be selected from intra prediction modes such as a vertical mode, horizontal mode, a DC mode, a diagonal_down_left mode, a diagonal_down_right, a vertical_right_mode, a horizontal_down, a vertical_left mode, and a horizontal_up mode. The intra prediction modes are well-known in the technical field, thus the detailed description about the above intra prediction modes are omitted hereafter.

In some embodiments, the prediction circuit 112 may predict values of successive pixels or pixel blocks based on the previously encoded pixels or previously encoded pixel blocks. For example, the prediction circuit 112 may predict a value of a pixel based on the previously encoded neighboring pixels (e.g., vertical and horizontal boundary pixels). In some embodiments, the values of the pixel to be predicted and the neighboring pixels are grey levels, but the disclosure is not limited thereto. The values of the pixel to be predicted and the neighboring pixels could be luminance values or color values such as red values, green values, blue values and any other values that are derived from at least one of the grey levels, the luminance value and the color values. The predicted pixels by the prediction circuit 112 may form the predicted image frame 1121.

In some embodiments, the display driver 100 includes a quantized lookup-table (LUT) 113 that may store a correspondence between the adaptive quantization step size, the adaptive quantization parameters QP and the grey levels of the pixels of the image frame (e.g., the predicted image frame or the residual image frame) that are outputted by the prediction circuit 112. Table 1 illustrates an example of the quantized LUT 113 in accordance with some embodiments. As shown in Table 1, the grey level of a predicted pixel or a residual pixel could be classified into one of the four bins B21, B22, B23 and B24, in which the bin B21 includes grey levels in a range from 0 to G1, the bin B22 includes grey levels in a range from G1 to G2, the bin B23 includes grey levels in a range from G2 to G3, and the bin B24 includes grey levels from G3 to 255. It is noted that number of bins and the values of G1 through G3 are determined according to designed needs. In some embodiments, the values of G1, G2, G3 are 40, 100 and 200, respectively, but the disclosure is not limited thereto.

Each of the bins corresponds to one adaptive quantization step size and one adaptive quantization parameter QP. As shown in Table 1, the bins B21 corresponds to the adaptive quantization step sizes of QS1 and the adaptive quantization parameter of QP1; the bin B22 corresponds to the adaptive quantization step sizes of QS2 and the adaptive quantization parameter of QP2; the bin B23 corresponds to the adaptive quantization step sizes of QS3 and the adaptive quantization parameter of QP3; and the bin B24 corresponds to the adaptive quantization step sizes of QS4 and the adaptive quantization parameter of QP4.

In some embodiments, the values of the QS1 through QS4 are arranged in incremental order, in which the value of QS1 is less than the value of QS2, the value of QS2 is less than the value of QS3, and the value of QS3 is less than the value of QS4. In other words, as the grey level of the predicted pixel or the residual pixel increases, the adaptive quantization step size increases; and as the grey level of the predicted pixel or the residual decreases, the adaptive quantization step size decreases. As such, more detail is retained when encoding pixels or pixel blocks with low grey levels; and less detail is retained when encoding the pixels or pixel blocks with high grey levels. Since human eyes are more sensitive to pixels with low grey levels and less sensitive to pixels with high grey levels. The encoding operation with adaptive quantization step size (or adaptive quantization parameter) based on the grey level of the predicted pixels or the residual pixels may reduce the visual distortion perceived by the human eyes.

TABLE 1 an example of the LUT 113

| Grey level of Predicted Pixel/ Residual Pixel | B21 [0, G1] | B22 [G1, G2] | B23 [G2, G3] | B24 [G3, 255] |
|---|---|---|---|---|
| Adaptive quantization step size | QS1 | QS2 | QS3 | QS4 |
| Adaptive quantization parameter | QP1 | QP2 | QP3 | QP4 |

In some embodiments, the quantization circuit 114 is coupled to the prediction circuit 112, and is configured to perform a quantization operation that quantizes the pixels of the image frame 1121 based on the adaptive quantization parameter QP (or the adaptive quantization step size) to generate a quantized image frame 1141. When the image frame 1121 is the predicted image frame obtained by the prediction operation, the quantization circuit 114 quantizes the predicted pixels of the predicted image frame based on the adaptive quantization parameter QP. When the image frame 1121 is the residual image frame obtained by subtracting the predicted image frame from the previous frame F1, the quantization circuit 114 quantizes the residual pixels of the residual image frame based on the adaptive quantization parameter QP. Referring to Table 1, each predicted pixel or residual pixel may be classified to one of the bins B21 through B24 based on the grey level of the pixel. The adaptive quantization step size or the adaptive quantization parameter QP corresponding to the pixel is obtained; and the quantization circuit 114 may quantize the pixel based on the corresponding adaptive quantization parameter QP.

The bitstream coding circuit 116 is coupled to the quantization circuit 114 and is configured to encode the quantized image frame 1141 to generate the encoded bit stream 111. Any suitable encoding technique that may be used to encode the quantized image frame 1141 to generate an encoded bit stream falls within the scope of the present disclosure. For example, the bitstream coding circuit 116 may use entropy encoding techniques such as context adaptive variable length coding (CAVLC), context adaptive binary arithmetic coding (CABAC), run length coding to generate the encoded bit stream 111. The encoded bit stream 111 may be stored in the memory 120 or may be directly transmitted to the encoder circuit 130.

The decoder circuit 130 may include a bitstream decoding circuit 132, an inverse quantization circuit 134 and a reconstruction circuit 136. The bitstream decoding circuit 132 may receive the encoded bit stream 111 from the memory 120 or may receive the encoded bit stream 111 directly from the output of the encoder circuit 110. The bitstream decoding circuit 132 is configured to decode the encoded bit stream 111 to generate a decoded bit stream 1321 in an inverse order of the order in which the bitstream coding circuit 116 perform the encoding operation. For example, the bitstream decoding circuit 132 may use decoding techniques (such as CAVLC or CABAC) corresponding to the encoding technique used by the bitstream coding circuit 116.

In some embodiments, the inverse quantization circuit 134 is coupled to the bitstream decoding circuit 132 and is configured to perform a reverse quantitation operation on the decoded image frame 1321 based on an inverse quantization parameter IQP to generate a dequantized image frame. The inverse quantization parameter IQP may be obtained from an inverse quantized LUT 133 that stores a correspondence between values of the decoded bit stream 1321 and an inverse quantization parameter IQP. The inverse quantization circuit 134 may perform the reverse quantitation operation in an inverse order of the order in which the quantization circuit 114 performs the quantization operation. The reconstruction circuit 136 is coupled to the inverse quantization circuit 134 and is configured to perform a reconstruction operation on the dequantized image frame that is outputted by the inverse quantization circuit 134 to generate a reconstructed image frame F1'. The reconstructed image frame F1 is considered as a reconstructed image frame of the image frame F1. The disclosure is not limited to any method or algorithm that is used to generate the reconstructed image frame F1' from the dequantized image frame.

Figure 3:
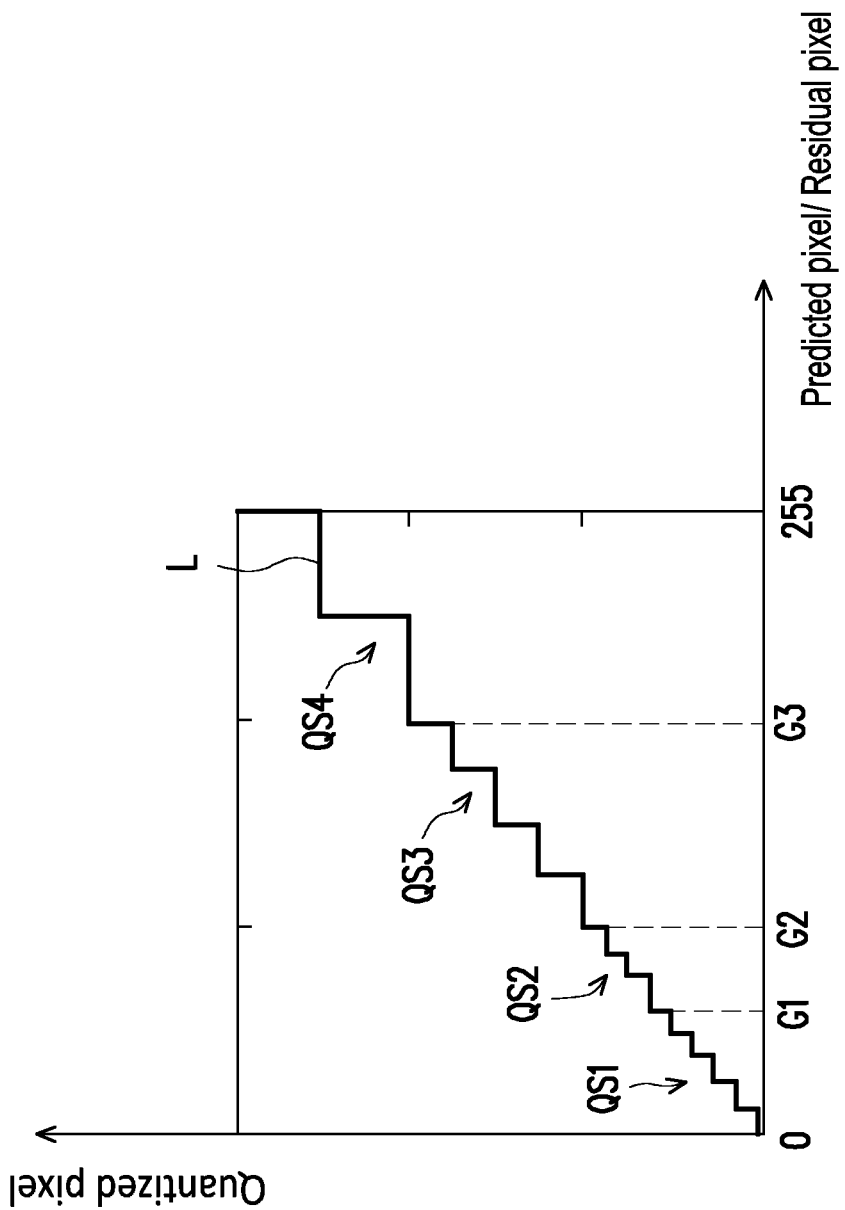
FIG. 3 is a diagram illustrating adaptive quantization step sizes with respect to grey levels of predicted pixels in accordance with some embodiments.

FIG. 3 illustrates adaptive quantization step sizes with respect to grey levels of predicted pixels or residual pixels in accordance with some embodiments. The horizontal axis of the diagram shown in FIG. 3 indicates the grey levels of the predicted pixels or residual pixels, and the vertical axis of the diagram indicates the grey levels of the quantized pixels. A stepped line L indicates the adaptive quantization step sizes that are used in the quantization operation performed by a quantization circuit (e.g., quantization circuit 114 in FIG. 2). As shown in FIG. 3, when the grey level of the predicted pixel or the residual pixel is in the range from 0 to G1, the adaptive quantization step size for the quantization operation is QS1. When the grey level of the predicted pixel or the residual pixel is in the range from G1 to G2, the adaptive quantization step for the quantization operation is QS2. When the grey level of the predicted pixel or the residual pixel is in the range from G2 to G3, the adaptive quantization step for the quantization operation is QS3. When the grey level of the predicted pixel or the residual pixel is in the range from G3 to 255, the adaptive quantization step for the quantization operation is QS4. The adaptive quantization steps QS1 through QS4 may be arranged in an incremental order.

Figure 4:
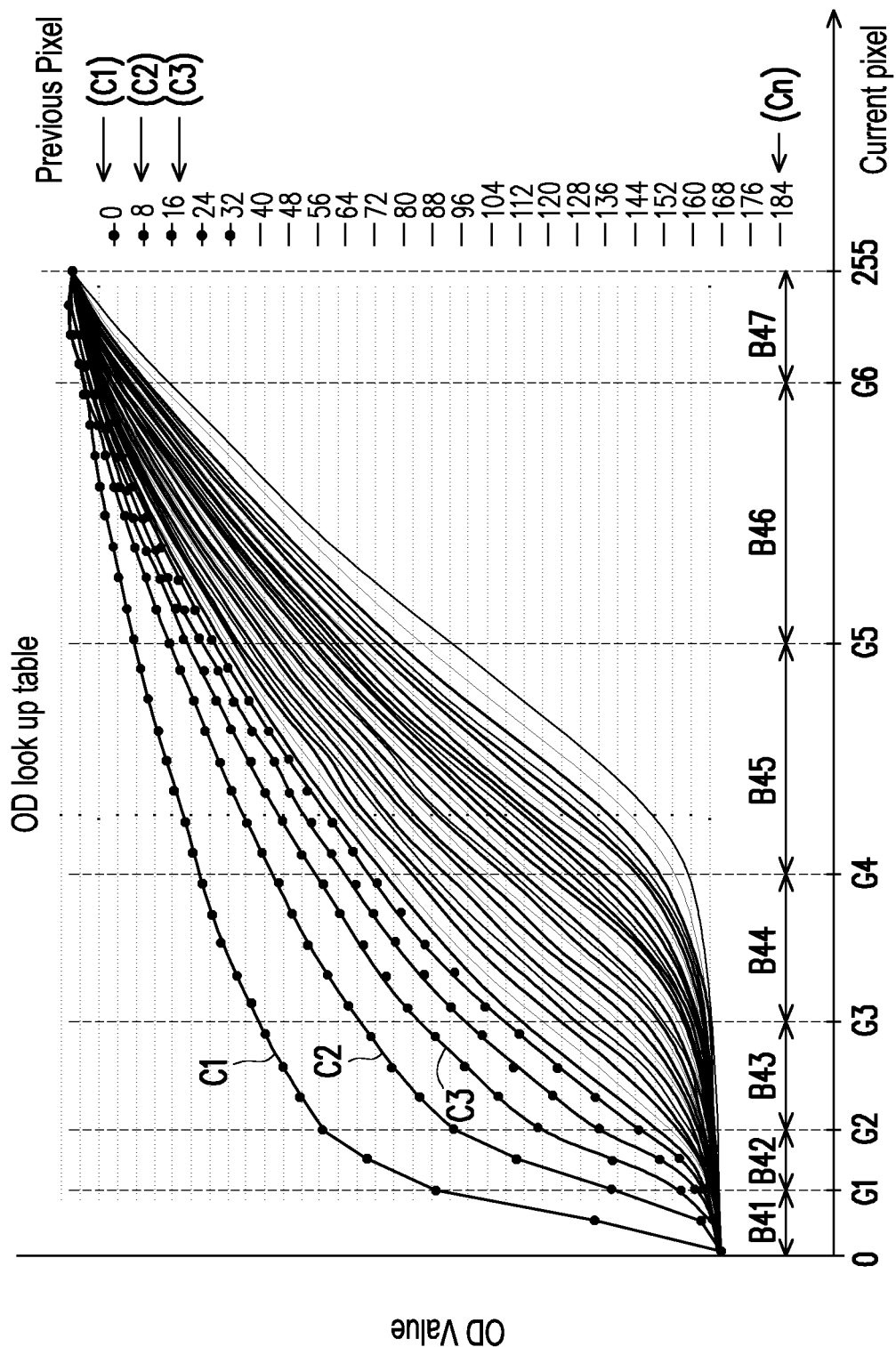
FIG. 4 is a diagram illustrating an overdrive lookup table in accordance with some embodiments.

FIG. 4 is a diagram illustrating an OD LUT (e.g., OD LUT 150 in FIG. 1) in accordance with some embodiments. The OD LUT may store a correspondence between the OD values and the values (e.g., grey levels) of pixels in the previous pixels and current pixels. The horizontal axis of the diagram shown in FIG. 4 indicates the grey levels of the current pixels in the current image frame (e.g., current image frame F2 in FIG. 1 and FIG. 2), and the vertical axis of the diagram shown in FIG. 4 indicates OD values. Each of curves C1 through Cn corresponds to a grey level of the previous pixels. For example, the curve C1 corresponds to the grey level "0" of the previous pixels; the curve C2 corresponds to the grey level "8" of the previous pixels; and the curve C(n) corresponds to the grey level "255" of the previous pixels. The OD value of a current pixel may be determined based on a change of the current pixel value and the previous pixel value. For example, when the previous pixel value of a specific pixel "0" and the grey level of the specific pixel in the current image frame is "8", the OD value is "48".

In some embodiments, the lower grey level of the previous pixel with sharper slope of the curves C1 through Cn may lead to higher distortion after compression performed by the encoder circuit 110. Further, higher grey level of the previous pixel with smoother slope of the curves C1 through Cn may lead to lower distortion after compression performed by the encoder circuit 110. The encoder circuit (e.g., encoder circuit 110 in FIG. 1 and FIG. 2) and the decoder circuit (e.g., decoder circuit 130 in FIG. 1 and FIG. 2) may determine the adaptive quantization parameter or the adaptive quantization step size based on the slope of the curves C1 through Cn shown in FIG. 4. For example, the adaptive quantization parameter is set such that more details are retained for the pixel regions having lower grey level of the previous pixel with sharper slope of the curves C1 through Cn, and less details are retained for the pixel regions having higher grey level of the previous pixel with sharper slope of the curves C1 through Cn.

As shown in FIG. 4, the current pixel may be classified to one of the bins B41 through B47 based on the grey level of the current pixel, in which each of the bins B41 through B47 corresponds to an adaptive quantization parameter or an adaptive quantization step size. For example, when the current pixel is in the range from 0 to G1, the current pixel is in the bin B41 which corresponds to the adaptive quantization step size of QS1 and the adaptive quantization parameter of QP1. In another example, when the grey level of the current pixel is in the range from G1 to G2, the pixel is in the bin B47 which corresponds to the adaptive quantization step size of QS7 and the adaptive quantization parameter of QP7. The correspondence of the grey level of the current pixel and the values of the adaptive quantization step size and the adaptive quantization parameter are illustrated in Table 2.

TABLE 2 correspondence of the grey level of the current pixel and the values of
the adaptive quantization step size and the adaptive quantization parameter

| Grey level of Predicted Pixel | B41 [0, G1] | B42 [G1, G2] | B43 [G2, G3] | B44 [G3, G4] | B45 [G4, G5] | B46 [G5, G6] | B47 [G6, G7] |
|---|---|---|---|---|---|---|---|
| Adaptive quantization step size | QS1 | QS2 | QS3 | QS4 | QS5 | QS6 | QS7 |
| Adaptive quantization parameter | QP1 | QP2 | QP3 | QP4 | QP5 | QP6 | QP7 |

Figure 5A:
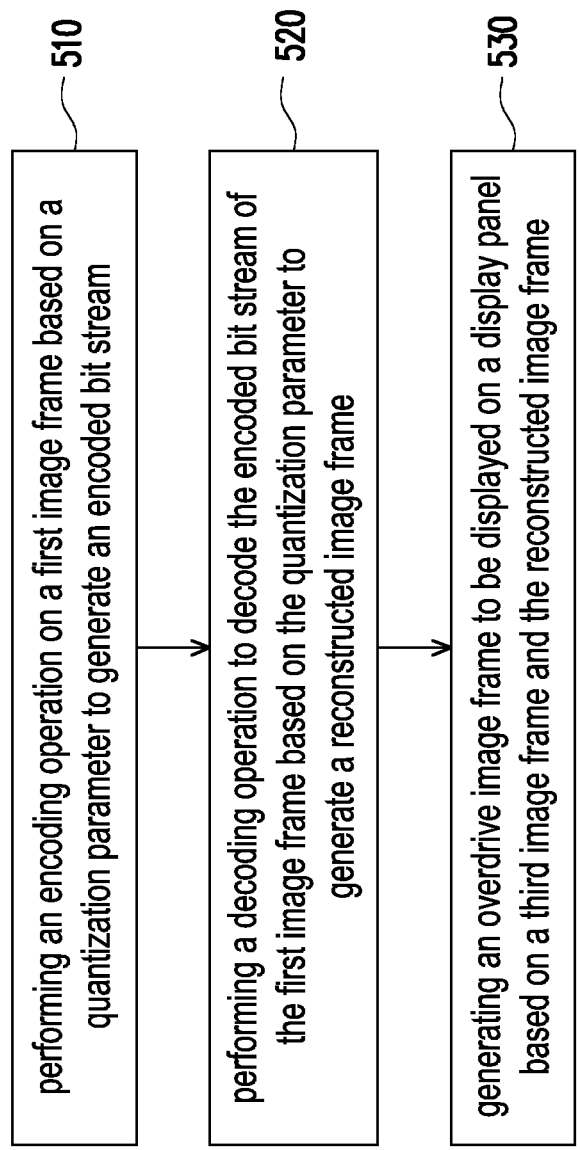
FIGS. 5A through 5B are a flowchart diagram illustrating an image processing method in accordance with some embodiments.
Figure 5B:
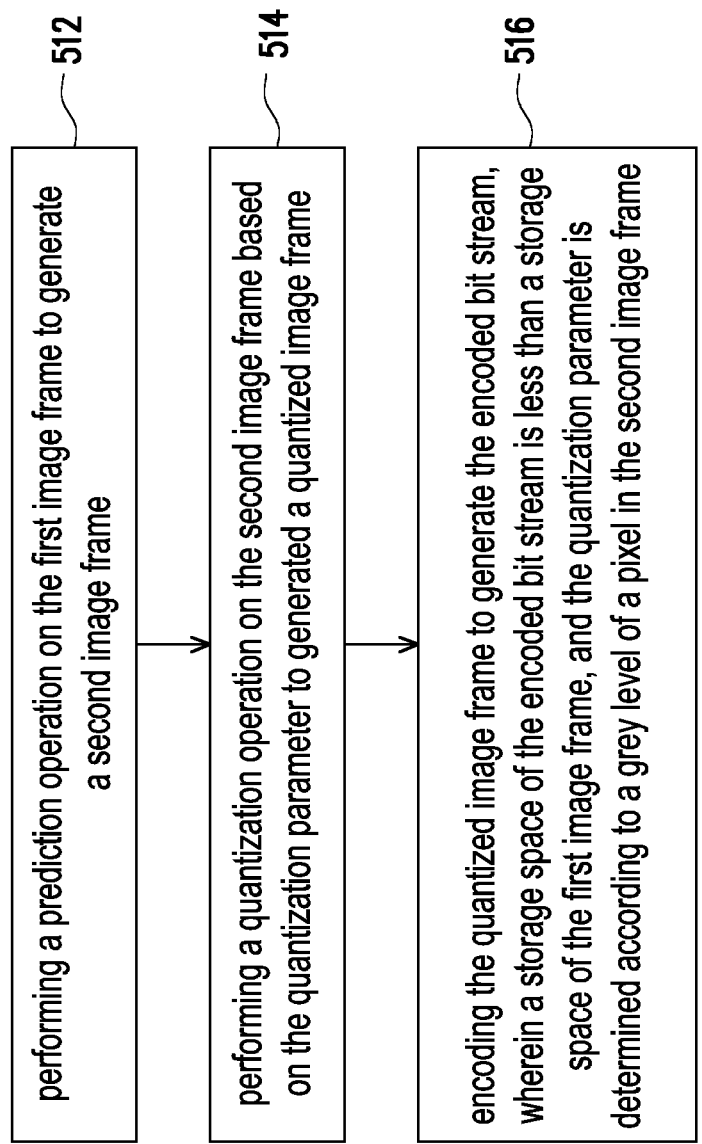

Referring to FIG. 5A through FIG. 5B, an image processing method for driving a display device with adaptive quantization parameter is illustrated in accordance with some embodiments of the disclosure. In step S510, an encoding operation is performed to a first image frame to generate an encoded bit stream according to a quantization parameter. In some embodiments, the step S510 may includes sub-steps S512, S514 and S516.

In step S512, a prediction operation is performed based on the first image frame to generate a second image frame. In some embodiments, the prediction operation is an intra prediction operation that is used to predict the value of a pixel based on the values of neighbouring pixels. In step S514, a quantization operation is performed on the second image frame based on the quantization parameter to generate a quantized image frame. In step S516, the quantized image frame is encoded to generate the encoded bit stream, wherein a storage space of the encoded bit stream is less than a storage space of the first image frame, and the quantization parameter is determined according to a grey level value of a pixel of the second image frame.

In step S520, a decoding operation is performed to decode the encoded bit stream of the first image frame based on the quantization parameter to generate a reconstructed image frame. In step S530, an overdrive image frame is generated based on a third image frame and the reconstructed image frame. The overdrive image frame is configured to be displayed on a display panel.

From the above embodiments, the quantization parameter for encoding an image frame is adapted according to grey level of a predicted pixel or a residual pixel. In some embodiments, the quantization parameter is adapted such that more details are retained when encoding the pixels with low grey level and less details are retained when encoding the pixel with high grey level. Since the human eyes are more sensitive to pixels with low grey level and less sensitive to pixel with high grey level, the adaptive quantization parameter may reduce the visual distortion and flicker on the display device, especially for the display device implementing overdrive technique.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An encoder, comprising:
   a prediction circuit, configured to perform a prediction operation on a first image frame to generate a second image frame;
   a quantization circuit, configured to perform a quantization operation on the second image frame based on a plurality of quantization parameters to generate a quantized image frame; and
   a bitstream coding circuit, configured to encode the quantized image frame to generate an encoded bit stream,
   wherein a storage space of the encoded bit stream is less than a storage space of the first image frame, and the plurality of quantization parameters are determined according to grey levels of pixels in the second image frame,
   wherein the pixels in the second image are classified into a plurality of bins according to the grey levels of the pixels, each of the plurality of bins has an upper limit value and a lower limit value, and a pixel in the second image is classified to a bin when the grey level of the pixel is within the lower limit value and the upper limit value of the bin,
   wherein each of the plurality of bins corresponds to one of the plurality of quantization parameters, and pixels in each of the plurality of bins is quantized using the corresponding one of the plurality of quantization parameters.

2. The encoder of claim 1, wherein the second image frame is a predicted image frame that is generated by performing the prediction operation on the first image frame.

3. The encoder of claim 1, wherein
   the prediction circuit performs the prediction operation on the first image frame to generate a predicted image frame, and
   the second image frame is a residual image frame that is obtained by subtracting the predicted image frame from the first image frame.

4. The encoder of claim 1, wherein
   each of the plurality of quantization parameters defines a quantization step size of the quantization operation, and
   the quantization step size defines a distance between two successive quantization levels of the quantization circuit,
   the quantization step size decreases as the grey level of the pixel of the second image frame decreases; and
   the quantization step size increases as the grey level of the pixel of the second image frame increases.

5. The encoder of claim 1, wherein
   each of the plurality of quantization parameters defines a number of bits required for encoding the pixel of the second image frame,
   the number of bits required for encoding the pixel increases as the grey level of the pixel of the second image frame decreases, and
   the number of bits required for encoding the pixel decreases as the grey level of the pixel of the second image frame increases.

6. The encoder of claim 1, wherein the plurality of quantization parameters are determined based on a lookup table that stores correspondence between the grey levels of the pixels and the plurality of quantization parameters.

7. A display device, comprising:
an encoder circuit, comprising:
  a prediction circuit, configured to perform a prediction operation on a first image frame to generate a second image frame;
  a quantization circuit, configured to perform a quantization operation on the second image frame based on a plurality of quantization parameters to generate a quantized image frame; and
  a bitstream coding circuit, configured to encode the quantized image frame to generate an encoded bit stream, wherein a storage space of the encoded bit stream is less than a storage space of the first image frame, and the plurality of quantization parameters are determined according to grey levels of pixels in the second image frame;
a decoder circuit, configured to decode the encoded bit stream of the quantized image frame based on the plurality of quantization parameters to generate a reconstructed image frame; and
an overdrive circuit, configured to receive a third image frame and the reconstructed image frame and generate an overdrive image frame to be displayed on a display panel based on the third image frame and the reconstructed image frame,
wherein the pixels in the second image are classified into a plurality of bins according to the grey levels of the pixels, each of the plurality of bins has an upper limit value and a lower limit value, and a pixel in the second image is classified to a bin when the grey level of the pixel is within the lower limit value and the upper limit value of the bin,
wherein each of the plurality of bins corresponds to one of the plurality of quantization parameters, and pixels in each of the plurality of bins is quantized using the corresponding one of the plurality of quantization parameters.

8. The display device of claim 7, wherein the second image frame is a predicted image frame that is generated by performing the prediction operation on the first image frame.

9. The display device of claim 7, wherein
the prediction circuit performs the prediction operation on the first image frame to generate a predicted image frame, and
the second image frame is a residual image frame that is obtained by subtracting the predicted image frame from the first image frame.

10. The display device of claim 7, wherein
each of the plurality of quantization parameters defines a quantization step size of the quantization operation, and
the quantization step size defines a distance between two successive quantization levels,
the quantization step size decreases as the grey level of the pixel of the second image frame decreases; and
the quantization step size increases as the grey level of the pixel of the second image frame increases.

11. The display device of claim 7, wherein
each of the plurality of quantization parameters defines a number of bits required for encoding the pixel of the second image frame,
the number of bits required for encoding the pixel increases as the grey level of the pixel of the second image frame decreases, and
the number of bits required for encoding the pixel decreases as the grey level of the pixel of the second image frame increases.

12. The display device of claim 7, wherein the plurality of quantization parameters are determined based on a lookup table that stores correspondence between the grey levels of the pixels and the plurality of quantization parameters.

13. The display device of claim 7, further comprising:
a memory, coupled to the encoder circuit and the decoder circuit, configured to store the encoded bit stream from the encoder and provide the encoded bit stream to the decoder.

14. The display device of claim 7, wherein
the overdrive circuit is configured to generate the overdrive image frame based on the third image frame and the reconstructed image frame using an overdrive lookup table, and
the overdrive lookup table stores correspondence between an overdrive value of the overdrive image frame, the grey level of the reconstructed image frame and the grey level of the third image frame.

15. An image processing method, adapted to a display device having a display panel, comprising: performing an encoding operation on a first image frame based on a plurality of quantization parameters to obtain an encoded bit stream, comprising:
performing a prediction operation on the first image frame to generate a second image frame;
performing a quantization operation on the second image frame based on the plurality of quantization parameters to generate a quantized image frame; and
encoding the quantized image frame to obtain the encoded bit stream, wherein a storage space of the encoded bit stream is less than a storage space of the first image frame, and the plurality of quantization parameters are determined according to grey levels of pixels in the second image frame;
performing a decoding operation to decode the encoded bit stream of the first image frame based on the plurality of quantization parameters to generate a reconstructed image frame; and
generating an overdrive image frame to be displayed on the display panel based on a third image frame and the reconstructed image frame,
wherein the pixels in the second image are classified into a plurality of bins according to the grey levels of the pixels, each of the plurality of bins has an upper limit value and a lower limit value, and a pixel in the second image is classified to a bin when the grey level of the pixel is within the lower limit value and the upper limit value of the bin,
wherein each of the plurality of bins corresponds to one of the plurality of quantization parameters, and pixels in each of the plurality of bins is quantized using the corresponding one of the plurality of quantization parameters.

16. The image processing method of claim 15, wherein the second image frame is a predicted image frame that is generated by performing the prediction operation on the first image frame.

17. The image processing method of claim 15, wherein
the prediction operation is performed on the first image frame to generate a predicted image frame, and
the second image frame is a residual image frame that is obtained by subtracting the predicted image frame from the first image frame.

18. The image processing method of claim 15, wherein
each of the plurality of quantization parameters defines a
quantization step size of the quantization operation, and
the quantization step size defines a distance between two
successive quantization levels,
the quantization step size decreases as the grey level of the
pixel of the second image frame decreases; and
the quantization step size increases as the grey level of the
pixel of the second image frame increases.

19. The image processing method of claim 15, wherein
each of the plurality of quantization parameters defines a
number of bits required for encoding the pixel of the
second image frame,
the number of bits required for encoding the pixel
increases as the grey level of the pixel of the second
image frame decreases, and
the number of bits required for encoding the pixel
decreases as the grey level of the pixel of the second
image frame increases.

20. The image processing method of claim 15, further
comprising:
determining the plurality of quantization parameters
based on a lookup table that stores correspondence
between the grey levels of the pixels and the plurality
of quantization parameters.

* * * * *